March 25, 1958 H. L. CHAFFIN 2,828,067
AIR COMPRESSOR
Filed Nov. 14, 1955

INVENTOR
HOWARD L. CHAFFIN
BY
ATTORNEYS

United States Patent Office 2,828,067
Patented Mar. 25, 1958

2,828,067

AIR COMPRESSOR

Howard L. Chaffin, Yorktown, Va.

Application November 14, 1955, Serial No. 546,838

10 Claims. (Cl. 230—174)

(Granted under Title 35, U. S. Code (1952), sec. 266)

The invention described herein may be manufactured and used by or for the Government of the United States of America for governmental purposes without the payment of any royalties thereon or therefor.

The present invention relates to air compressors and more particularly to double-acting, double-headed reciprocating air compressors suitable for developing high pressures with a minimum of leakage. The present invention comprises a reciprocating piston having a pair of axially aligned bores formed therein, the bores being separated by a wall at the center of the piston. Male cylindrically shaped members extend into the bores of the piston at the outer ends thereof, the male members being fixed to or formed integrally with cylinder heads attached to each end of a hollow cylindrical casing member in which the piston reciprocates. In order to prevent leakage between the piston and the fixed male members, the male members are provided with a plurality of circumferential grooves in which are mounted seals of the expanding piston ring type.

Prior art compressors have proved to be unsatisfactory in high pressure operation, and particularly with respect to the use therein of piston rod seals of the "garter" spring type. For such high pressure uses, it is common practice to employ multiple sealing rings. In the use of such sealing rings, it is difficult to control the pressure drop across each ring so that all are effective and no single ring carries the entire load. Under such condition when a single ring carries the load, the ring overheats, thus causing oxidation of the lubricant components. Also, the mechanical bulk and the space required for radial motion of "garter" spring seals necessitates that a minimum volume be provided between the rings. The irreversible compression process which the air trapped in the spaces between the rings experiences, as the pressure oscillates, generates heat which is difficult to carry away. It has been found that this heat cannot be transferred without seriously weakening the packing retainer. Failure of this type of seal usually starts with the aforementioned heating which causes oxidation of certain components of the lubricant. These oxides are in the form of gummy deposits which restrict the action of the seals which, in turn, produces further overheating and the cracking of the lubricant, leading to further deposits. Failure is usually accelerated at this point by burning of the seals or, probably, a flash explosion of lubricant vapors and air within the spaces between the seals. A further disadvantage of conventional double-acting compressors having piston rods is that the clearance volumes at the ends of the strokes on opposite sides of the piston are not equal.

An object of the present invention is to provide a new and improved double-acting, double-headed reciprocating air compressor having piston ring type seals which prevent seal failure and increase the efficiency thereof.

Another object is to provide a new and improved double-acting air compressor which displaces an equal volume of air during each stroke regardless of direction of movement of the piston, thus to reduce fluctuations in output.

Still another object is to provide a new and improved reciprocating compressor having structure which avoids the use of external rod packing rings and the failures inherent thereto.

Other objects and many of the attendant advantages of this invention will be readily appreciated as the same becomes better understood by reference to the following detailed description when considered in connection with the accompanying drawings wherein.

Figure 1:
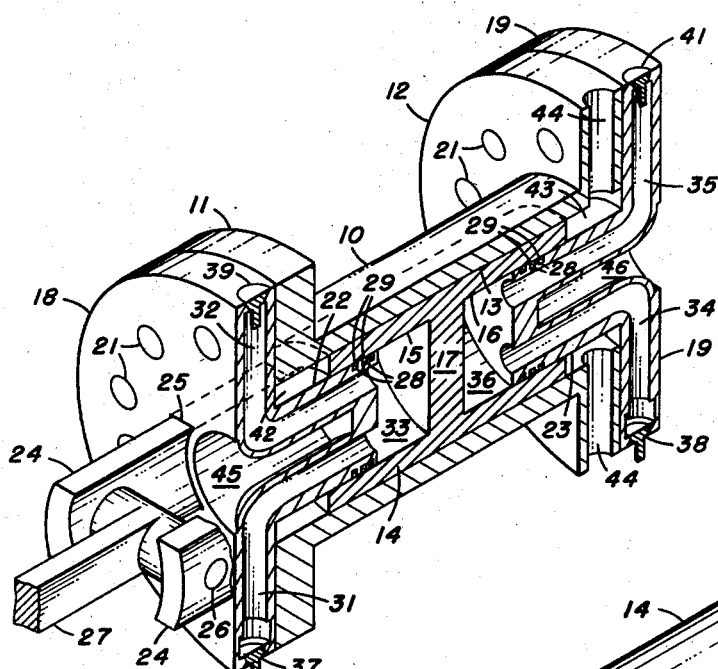
Fig. 1 is an isometric sectional view of the compressor of the present invention.
Figure 2:
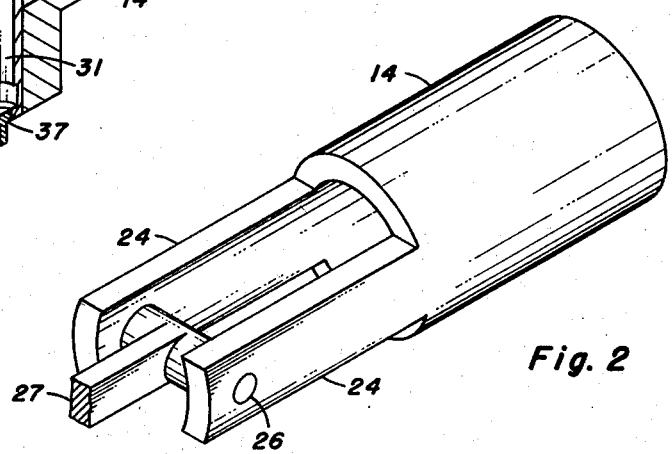
Fig. 2 is an isometric view of the piston thereof.

Referring more particularly to the drawings, wherein like numerals indicate like parts throughout the several views, 10 indicates a cylindrical casing having flanges 11 and 12 at the ends thereof, and an axial bore 13. Mounted in the bore 13 is a piston member 14 having a pair of axial bores 15 and 16. The bores 15 and 16 are separated by a bulkhead or wall 17 and open on opposite ends of the piston 14.

The opposite ends of casing 10 are closed by cylinder heads 18 and 19. Heads 18 and 19 are secured to flanges 11 and 12, respectively, in any desired manner, the securing means being indicated at 21. Male cylindrical members 22 and 23 may be formed integrally with heads 18 and 19, respectively, and extend into the bores 15 and 16 of piston 14.

A pair of diametrically opposed strut rods 24 are formed on one end of piston 14 and extend in an axial direction through slots 25 in cylinder head 18. A pin 26 is mounted in rods 24 adjacent the outer end thereof and pivotally supports one end of a connecting rod 27 between the outer ends of strut rods 24. The other end of connecting rod 27 may be connected to any form of crank driving means (not shown).

The inner ends of the cylindrical members 22 and 23 are provided with circumferential grooves 28 in which are mounted piston rings 29, which may be of the external expanding metallic type. The rings 29 bear against the walls of the bores 15 and 16 to form a substantially leak-proof joint between piston 14 and the male members 22 and 23.

It will be seen from the foregoing, that the use of an axial piston rod has been avoided in the structure set forth, thus avoiding the use of external packing joints and the disadvantages heretofore mentioned.

Head 18 and member 22 are provided with an inlet bore 31 and an outlet bore 32. These bores, at the inner ends thereof, open into a chamber 33 formed by bore 15, wall 17 and member 22. Head 19 and member 23 are formed with an inlet bore 34 and an outlet bore 35. These bores, at the inner ends thereof, open into a chamber 36 formed by bore 16, wall 17 and member 23.

Inlet bores 31 and 34 are provided with inlet valves 37 and 38, respectively, while outlet bores 32 and 35 are provided with outlet valves 39 and 41. These valves have been shown diagrammatically in the drawings and any valves suitable for the purpose may be employed. It is, of course, understood that the bores 31, 32, 34 and 35, at the outer ends thereof may be connected to suitable conduits (not shown) for conveying air to and from the compressor, as desired.

As shown, a pair of chambers 42 and 43 are formed at the outer ends of the piston 14. Vents 44 communicating with chamber 43 are formed in flange 12 of casing 10 for relieving pressure built up in chamber 43, while the clearances between slots 25 and strut rods 24 relieve the pressure built up in chamber 42. If desired, flange 11 may be provided with vents similar to vents 44.

In order to provide for cooling of the members 22 and 23, axial recesses 45 and 46, respectively, are provided therein. It is, also, pointed out that the casing 10 may be provided with cooling passages (not shown) in the walls thereof for the circulation of water or other cooling fluid. Piston 14 may, also, be water cooled by providing passages (not shown) in the walls thereof and connecting flexible conduits thereto through slots in chamber 10.

In operation, connecting rod 27 reciprocates piston 14 in bore 13 of casing 10 through strut rods 24, pressure being built up alternately in chambers 33 and 36. The air is drawn in through inlet valves 37 and 38 and expelled through outlet valves 39 and 41 as the piston reciprocates.

Figure 3:
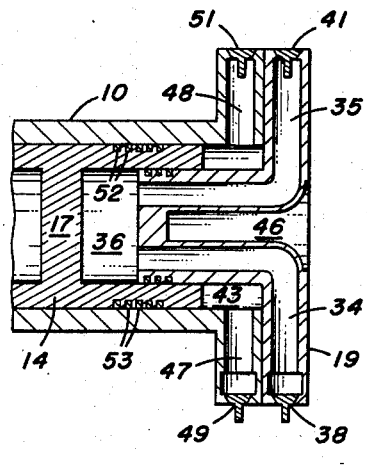
Fig. 3 is a fragmentary sectional view of a slightly modified form of the compressor.

A slight modification of the compressor of Fig. 1 is shown in Fig. 3. In this form of the invention, another compressing stage is added to the compressor of Fig. 1 by making use of chamber 43, the vents 44 of Fig. 1 becoming the inlet and outlet bores 47 and 48, respectively, for the chamber 43. Inlet valve 49 is placed in the outer end of bore 47, while outlet valve 51 is placed in the outer end of bore 48. In this form of the invention grooves 52 are formed in piston 14 in which rings 53 similar to rings 29 are mounted, thus substantially preventing leakage between piston 14 and bore 13. It will thus be seen that as the piston 14 is reciprocated, air is drawn into chamber 43 through valve 49 and expelled therefrom through valve 51.

It is to be understood that while the term "air" has been employed throughout this specification as the compressible medium, any gas is equally applicable.

Obviously many modifications and varations of the present invention are possible in the light of the above teachings. It is therefore to be understood that within the scope of the appended claims the invention may be practiced otherwise than as specifically described.

What is claimed is:

1. A compressor suitable for high pressures comprising, a casing having an axial bore, a piston having opposed axial bores therein and mounted in the bore of said casing for reciprocating motion along the axis thereof, a pair of cylinder heads fixed to the ends of said casing for closing the ends of the bore of said casing, one of said cylinder heads having at least one slot therein communicating with said casing bore, means passing through said slot for imparting reciprocating motion to said piston, a pair of male members fixed to said cylinder heads and extending into the bores of said piston, the bores of said piston and said male members forming a compression chamber in each end of said piston, a vent in the other cylinder head communicating with said casing bore, air inlet and outlet bores individual to and communicating with each of said chambers, inlet valve means in each of said air inlet bores, and outlet valve means in each of said air outlet bores.

2. A compressor suitable for high pressures comprising, a casing having an axial bore, a piston having opposed axial bores therein and mounted in the bore of said casing for reciprocating motion along the axis thereof, a pair of cylinder heads fixed to the ends of said casing for closing the ends of said bore, one of said cylinder heads having at least one slot therein communicating with said casing bore, means passing through said slot for imparting reciprocating motion to said piston, a pair of male members fixed to said cylinder heads and extending into the bores of said piston, a vent in the other cylinder head communicating with said casing bore, the bores of said piston and said male members forming a chamber at each end of said piston, inlet valve means communicating with said chambers, and outlet valve means communicating with said chambers.

3. A compressor suitable for high pressures comprising, a casing having an axial bore, a piston having a pair of opposed axial bores therein and mounted in the bore of said casing for reciprocating motion therein, a pair of cylinder heads fixed to the ends of said casing for closing the ends of said bore, one of said cylinder heads having at least one slot therein communicating with said casing bore, means passing through said slot for imparting reciprocating motion of said piston, a pair of male members formed integrally with said cylinder heads and extending into the bores of said piston, a vent in the other cylinder head communicating with said casing bore, said bores of said piston and said male members forming a pair of chambers, and valve means communicating with said chambers and controlling the intake and exhaust of said chambers as the piston reciprocates.

4. A compressor suitable for high pressures comprising, a casing having an axial bore, a piston having opposed axial bores therein and mounted in the bore of said casing, a pair of cylinder heads fixed to the ends of said casing for closing the ends of the bore in said casing, one of said cylinder heads having a pair of slots therein aligned with the periphery of said piston, a pair of struts formed on one end of said piston and extending through said slots, means attached to the outer ends of said struts for reciprocating said piston, a vent in the other cylinder head communicating with said casing bore, a pair of male members integrally formed on said cylinder heads and extending into the bores of said piston, and valve means mounted in said cylinder heads and communicating with said male members.

5. A compressor suitable for high pressures comprising, a casing having an axial bore, a piston having opposed axial bores therein and mounted in the bore of said casing, a pair of cylinder heads fixed to the ends of said casing for closing the ends of the bore in said casing, one of said cylinder heads having therein a pair of diametrically opposed slots aligned with the periphery of said piston, a pair of diametrically opposed struts formed on one end of said piston and extending through said slots, means attached to the outer ends of said struts for reciprocating said piston, a pair of male members integrally formed on said cylinder heads and extending into the bores of said piston, a vent in the other cylinder head communicating with said casing bore, the bores of said piston and said male members forming a chamber at each end of said piston, air inlet and outlet passages individual to and communicating with each of said chambers, inlet valve means in each of said inlet passages, and outlet valve means in each of said outlet passages.

6. A compressor suitable for high pressures comprising, a casing having an axial bore, a piston having opposed axial bores and mounted in the bore of said casing, a pair of cylinder heads fixed to the ends of said casing for closing the ends of the bore thereof, one of said cylinder heads having at least one slot therein communicating with said casing bore, means passing through said slot for imparting reciprocating motion to said piston, a pair of male members fixed to said cylinder heads and extending into the bores of said piston, a vent in the other cylinder head communicating with said casing bore, a plurality of grooves formed circumferentially in said male members and adjacent the ends thereof within the bores of said piston, a plurality of expansible rings mounted in said grooves and engaging the walls of the bores of said piston, the bores of said piston and said male members forming a chamber in each end of said piston, and inlet and outlet valve means communicating with said chambers.

7. A compressor suitable for high pressures comprising, a casing having an axial bore, a piston having opposed axial bores therein and mounted in the bore of said casing, a pair of cylinder heads fixed to the ends of said casing for closing the ends of the bore thereof, one of said cylinder heads having a pair of diametrically spaced slots aligned with the periphery of said piston, a pair of diametrically opposed struts formed on one end of said piston and extending through said slots, means attached to the outer ends of said struts for reciprocating said piston, a vent in the other cylinder head communicating with said casing bore, a pair of male members integrally formed on said cylinder heads and extending into the bores of said piston, the bores in said piston and said male members forming a pair of chambers in the ends of said piston, valve means mounted in said cylinder heads and communicating with said chambers, a plurality of grooves formed in said male members and adjacent the ends thereof within the bores of said piston, and a plurality of expansible rings mounted in said grooves and engaging the walls of the bores in said piston.

8. A compressor suitable for high pressures comprising, a casing having an axial bore, a piston having opposed axial bores therein and mounted in the bore of said casing, means for imparting reciprocating motion to said piston, a pair of cylinder heads fixed to the ends of said casing for closing the ends of the bore in said casing, a pair of male members fixed to said cylinder heads and extending into the bores of said piston, the bores of said piston and said male members forming a compression chamber in each end of said piston, valve means communicating with said chambers, the bore of said casing, one end of said piston and one of said male members forming an additional compression chamber, and additional valve means communicating with said additional compression chamber.

9. A compressor suitable for high pressures comprising, a casing having an axial bore, a piston having opposed axial bores therein and mounted in the bore of said casing, a pair of cylinder heads fixed to the ends of said casing for closing the ends of the bore in said casing, a pair of male members fixed to said cylinder heads and extending into the bores of said piston, means exterior of said male members for imparting reciprocating motion to said piston, the bores of said piston and said male member forming a compression chamber in each end of said piston, valve means communicating with said chambers, the bore of said casing, one end of said piston and one of said male members forming an additional compression chamber, additional valve means communicating with said additional compression chamber, and means for providing a leakproof seal between said male members and the bores of said piston and between said piston and the bore of said casing.

10. A compressor suitable for high pressures comprising, a hollow cylindrical casing, a piston having opposed axial bores therein and mounted in the bore of said casing, a pair of cylinder heads fixed to the ends of said casing for closing the ends of said bore of said casing, one of said cylinder heads having a pair of slots therethrough a pair of male members fixed to said cylinder heads and extending into the bores of said piston, means exterior of said male members and formed integrally with said piston for imparting reciprocating motion to said piston, said last named means extending exteriorly of said cylinder heads through said slots, and a vent in the other cylinder head communicating with said casing bore.

References Cited in the file of this patent

UNITED STATES PATENTS

| | | |
|---|---|---|
| 957,597 | Bastian | May 10, 1910 |
| 1,551,480 | Gruman | Aug. 25, 1925 |

FOREIGN PATENTS

| | | |
|---|---|---|
| 915,526 | Germany | July 22, 1954 |